June 20, 1972     E. WOLF     3,671,371
DEVICE FOR ATTACHING A THERMOPLASTIC FOIL
TO A SUPPORTING STRUCTURE
Original Filed Sept. 5, 1967     2 Sheets-Sheet 1

INVENTOR
EMANUEL WOLF

BY
ATTORNEY

United States Patent Office 3,671,371
Patented June 20, 1972

3,671,371
DEVICE FOR ATTACHING A THERMOPLASTIC FOIL TO A SUPPORTING STRUCTURE
Emanuel Wolf, Horgen, Switzerland, assignor to Ironflex AG, Zurich, Switzerland
Original application Sept. 5, 1967, Ser. No. 665,393, now Patent No. 3,562,054, dated Feb. 9, 1971. Divided and this application Feb. 19, 1970, Ser. No. 12,689
Claims priority, application Switzerland, Sept. 7, 1966, 12,961/66; Sept. 26, 1966, 13,865/66
Int. Cl. B32b 7/08
U.S. Cl. 161—43
6 Claims

ABSTRACT OF THE DISCLOSURE

A device for attaching a thermoplastic foil at a supporting structure wherein the foil is heat sealed or welded to a holding plate formed by a metallic core and a thermoplastic cover layer. The holding plate is rigidly connected to the supporting structure and subsequently the foil is placed over the holding plate. Welding heat is generated by creating a high frequency field between the metallic core of the holding plate and an electrode placed on the side of the foil facing away from the holding plate. The metallic core of the holding plate forms a counter electrode.

BACKGROUND OF THE INVENTION

The present application is a divisional application of my commonly assigned, copending United States application Ser. No. 665,393, filed Sept. 5, 1967, now U.S. Pat. 3,562,054, and entitled "Method and Device for Attaching a Foil at a Supporting Structure."

The present invention relates to an improved device for attaching a thermoplastic foil to a supporting structure, particularly in connection with the lining, sealing or insulating of walls or roofs of tunnels or buildings.

Methods are known for the covering of surfaces of walls or roofs with a thermoplastic foil in connection with the thermal insulation and/or sealing of such structures. However, the problem of attaching a foil to such structures in an economical manner and without penetrating the foil has not been solved. It is evident that a perfect insulation or seal cannot be obtained if bolts or nails are used which penetrate through holes in the foil in order to attach the latter to the surface, since there is always the danger of leaks occurring if such holes are present. In a similar manner, the problem of attachment exists in cases where the foil itself is to form a temporary roof or wall and must be supported at a scaffold or frame.

It has been suggested to secure to a surface to be sealed holding plates by means of nails. The holding plates are profiled such that the foil which is subsequently placed over the surface carrying the holding plates, may be clamped to the holding plates by means of profiled slides, which engage the holding plates and the foil portion therebetween. However, when placing a profiled slide over a respective holding plate, the foil portion in this location is subjected to quite considerable deformation. This deformation of the foil, which is necessary to permit interengagement between the holding plate on the one side of the foil and the slide on the other side of the foil, may in certain instances lead to tension stresses built up locally in the foil, with resulting danger of rupture in the stressed foil portion. It has been proposed to heat the foil in the portion subjected to deformation, particularly where relatively thick foils are required, in order to facilitate such deformation. However, apart from the additional work involved in the heating of the foil and the fact that the danger of rupture in the foil cannot be completely excluded, this method of attachment of the foil is relatively expensive in view of the high cost of the profiled holding plate and the profiled slide which are normally required in great numbers.

SUMMARY OF THE INVENTION

Accordingly, one of the primary objects of the present invention is to employ the heat-sealable properties of thermoplastic foils for the attaching of such foils to supporting surfaces.

Another significant object of the present invention relates to the provision of a high frequency field for heating and melting at least the boundary surfaces of two superimposed layers of thermoplastic material.

A further equally important object of the present invention relates to the establishing of a high frequency field through a plurality of superimposed layers of thermoplastic material by feeding current only to electrodes situated adjacent the uppermost layer.

Still another important object of the present invention concerns an improved device for the quick, efficient and reliable sealing and/or insulation of walls or roofs by means of thermoplastic foils, wherein it is possible to attach the foils to the wall or roof without damaging such foils.

Now, in order to achieve these and still further objects which will become more readily apparent as the description proceeds, the invention utilizes a welding technique in attaching a foil of thermoplastic material to a supporting structure, in which an auxiliary electrode is employed. More specifically, a holding member or plate secured at the supporting structure, is used as the counter electrode for a high frequency welding electrode unit on the one hand and on the other hand as an element interconnecting the foil with the supporting structure. To this end, the holding member or plate comprises a metallic portion serving as electrode and a surface layer or cover of thermoplastic material to which the foil may be connected by high frequency welding.

BRIEF DESCRIPTION OF THE DRAWINGS

The invention will be better understood and objects other than those set forth above, will become apparent, when consideration is given to the following detailed description thereof. Such description makes reference to the annexed drawings wherein.

DESCRIPTION OF THE PREFERRED EMBODIMENTS

Figure 1:
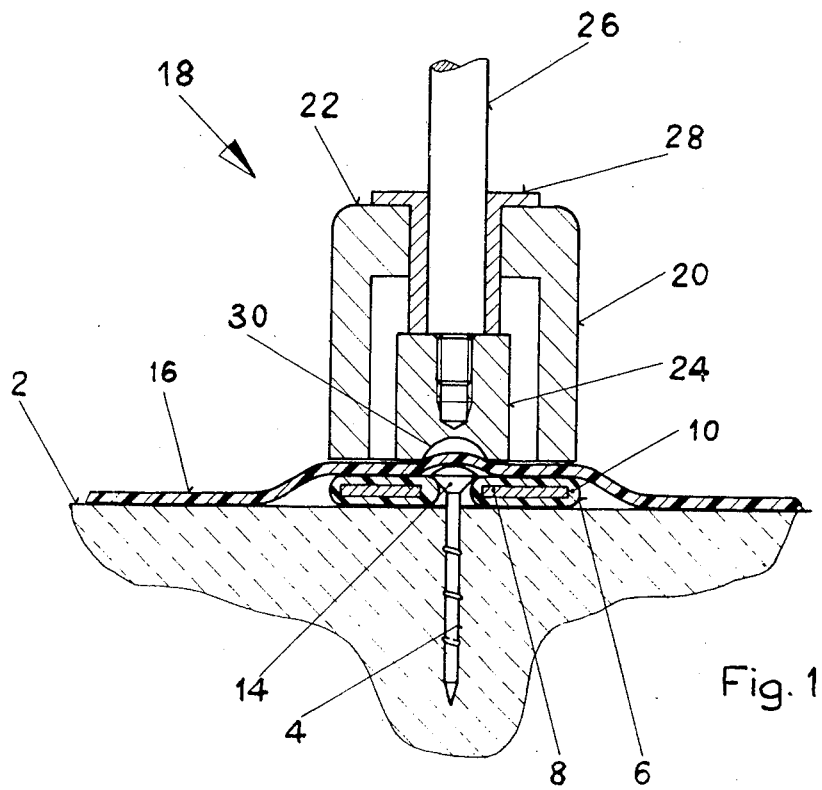
FIG. 1 schematically illustrates the inventive foil attachment in connection with a first embodiment and with a welding electrode unit, in section.

In FIG. 1 reference numeral 2 designates a concrete roof portion of a flat-top building. At the upper side of this roof portion, holding plates or generally indicated at 6 are secured by means of nails or bolts 4. For the sake of simplicity only a single nail and a single holding plate is depicted in FIG. 1, while it will be understood that a multitude of holding plates and associated nails will be used in connection with the insulation or sealing of the full extent of the roof surface. Each holding plate 6 is of generally annular shape and comprises a metallic core portion 8 and a cover portion 10 made of a suitable thermoplastic and surrounding the core 8 on all sides. Nail 4 extends through a central opening 12 in holding plate or disc 6, which is held down to the surface of the roof portion by means of the head 14 of nail 4, having a larger diameter than the opening 12. In order to insulate or seal roof portion 2, such roof portion or roof is covered by a foil 16 of synthetic thermoplastic material. This foil 16 is attached to the roof 2 by means of the holding plates or disc 6 and the nails 4. To this end, foil 16 in its portion overlying disc 6 is interconnected with the latter by welding. The weld may be effected by suitably heating the foil on its upper and outer side.

Preferably welding of foil 16 to the holding plate 6, i.e. the cover 10 of the latter is effected by means of high frequency heating. For this purpose, the electrode unit illustrated in FIG. 1 in vertical section is provided.

Electrode unit 18 comprises an annular welding electrode 20 and a complementary electrode 24 coaxially arranged within annular welding electrode 20. A connector bar 26 extends through top wall 22 of welding electrode 20 and is screwed into complementary electrode 24 so as to maintain the latter in coaxial relation to the welding electrode 20. An insulating sleeve 28 surrounds connector bar 26 so as to position the latter. Complementary electrode 24, which forms a mass or grounding electrode, is of cylindrical configuration and comprises a recesses 30 opening into the downwardly directed face thereof. The diameter of recess 30 is somewhat larger than that of head 14 of nail 4, so that such recess is capable of receiving the bulge formed above the head 14 by foil 16. The outer diameter of the annular electrode 20 corresponds substantially to the outer diameter of metallic core 8 of holding plate 6. In order to carry out the welding process, the electrodes 20 and 24, which are connected to a high frequency generator (not shown) are placed on the foil 16 above holding plate 6. Correct positioning of the electrode unit in coaxial relation to disc or holding plate 6 is facilitated by head 14 and the bulge formed thereby in the foil, which will come into engagement with recess 30 of electrode 24.

Figure 2:
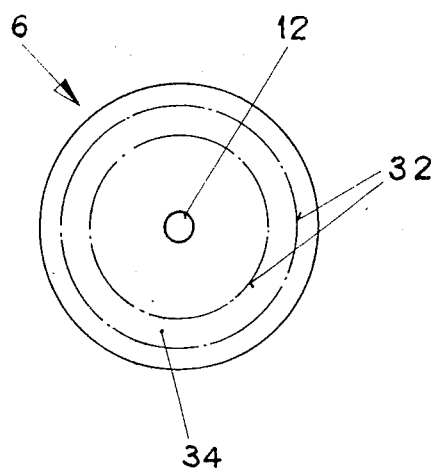
FIG. 2 shows an end view of the welding electrode unit of FIG. 1.
Figure 3:
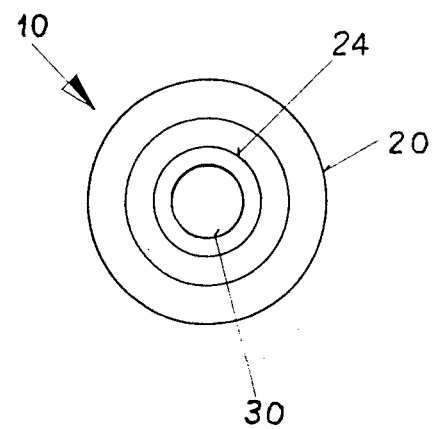
FIG. 3 illustrates the holding plate of the attachment of FIG. 1 in plan view.

In FIG. 2, which is a plan view of the holding plate or disc 6, dash and dot lines 32 delimit the welding zone 34 which is of annular configuration. In this welding zone the foil 16 is interconnected with cover 10 of holding plate 6.

Preferably coating or covering of the core 8 of holding plate 6 with a synthetic thermoplastic material forming cover 10 around the core 8 is effected in accordance with a known dipping process. The thermoplastic material of the cover is chosen so as to permit welding and preferably high frequency welding to the material of the foil 16. Suitable materials for this purpose are polyvinyl chloride or polyethylene. It will be understood that the core 8 consisting of metal of suitably high electrical conductivity serves as an auxiliary electrode during welding in that a high frequency field is built up between this core and the electrodes 20 and 24. Consequently, the thermoplastic material located in this high frequency field will be heated to a melting temperature at least in its boundary zones and weld 34 will be formed. Suitable materials for the core are brass or aluminum or alloys thereof. The holding plate comprising the auxiliary electrode remains in situ and permanently interconnects the foil with the nail 4 and thereby with the roof portion 2.

Figure 4:
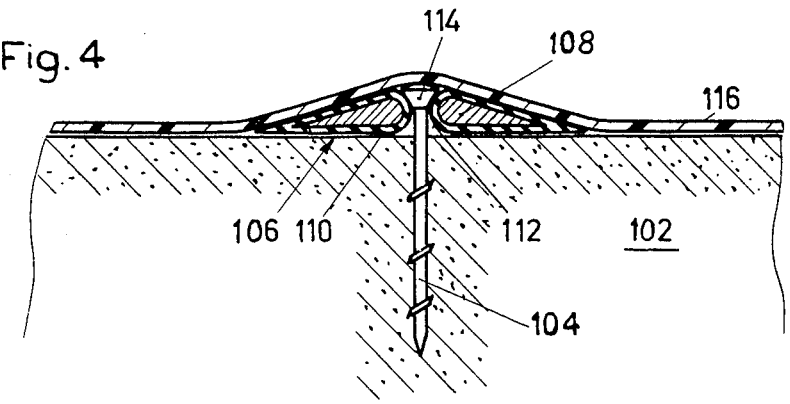
FIG. 4 is a second embodiment of the inventive attachment, shown in section.

In the embodiment illustrated in FIG. 4 numeral 102 designates a roof portion of a building. Holding plates 106 are attached to the upper side of the roof by means of nails 104. Again, for the sake of simplicity, only one nail and only one holding plate are shown. Each holding plate 106 is formed by a substantially ring-shaped member and comprises a frusto-conical metallic core 108 and a cover 110 of thermoplastic material, which surrounds core 108 on all sides. Nail 104 extends through a central opening 112 of holding plate 106 and secures the latter at the top of the roof by means of its head portion 114. The top of the roof is insulated by means of a thermoplastic foil 116, which is attached to roof 102 by means of the disc 106 and the nails 104. To this end, foil 116 is interconnected with the cover 110 of each disc 106 by welding or heat sealing.

The weld or heat seal between foil 116 and the cover 110 of holding plate 106 may again be made by means of high frequency heating and a device similar to the one described in connection with FIG. 1 may be used with the difference, however, that the electrode unit corresponds in its configuration to the conical shape of holding plate 106. Correspondingly, the core 108 of ring 106 has again the function of an auxiliary electrode and at the same time serves to impart to the ring or holding plate sufficient mechanical strength. In order to fulfill the latter purpose the core would not require the illustrated frusto-conical configuration but could also be made of a disc cut from metallic sheet material and pressed into suitable form. It will, however, be noted that the configuration of the upper side of disc 106 provides for a relatively even transition of the foil from the surrounding roof surface and the upper surface of the ring. Since the foil is supported also in the transition zone between the top of the roof and the top of the disc, tears or rents occurring upon application of local mechanical loads, such as those caused by workmen walking on the roof, may be avoided. Suitable cross-sections of the disc may also be obtained by injection or press moulding methods, in which the core is embedded in the mould.

Figure 5:
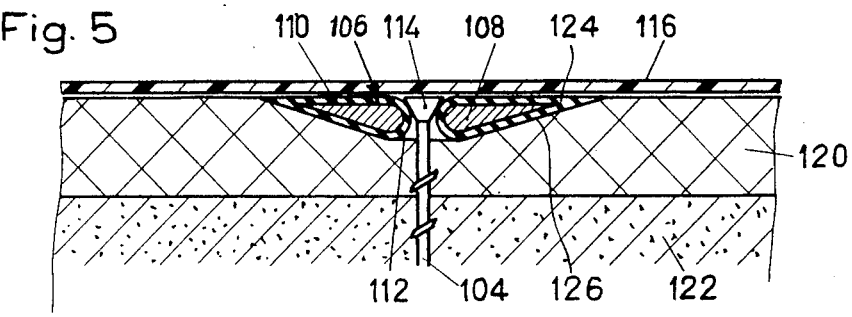
FIG. 5 illustrates a modification of the attachment shown in FIG. 4.

In the embodiment of FIG. 4 holding plate 106 has its flat side facing and contacting the top surface of roof 102. In contrast to this embodiment the modification of FIG. 5 shows holding plate 106 in inverted position. Consequently, flat base surface 124 of holding plate 106 is upwardly directed and welded on this side to foil 116 whereas frusto-conical side 126 is downwardly directed and embedded in an insulating layer 120 of relatively soft or resilient material arranged above concrete roof structure 122. Holding plate 106 forms a depression in insulating layer 120 when nail 104 is driven or fired into structure 122.

Figure 6:
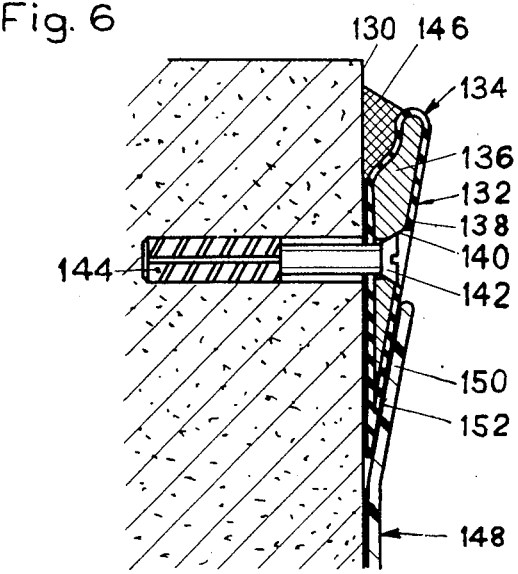
FIG. 6 is a third embodiment of the invention attachment in which a holding rail is used.

FIG. 6 illustrates an embodiment of the invention in which a vertical surface 130 of a building is to be sealed by means of a foil 148. Holding means in the form of a holding rail generally indicated at 132 are provided. Holding rail 132 which is wedged-shaped in cross-section extends horizontally along vertical surface 130. Holding rail 132 has an upwardly directed nose portion 134 and comprises a metallic core 136 and a cover 138 made of thermoplastic material. Holding rail 132 further comprises a plurality of bores 140 which are equally spaced over the length of the rail. Countersunk screws 142 extend through bores 140 and engage slotted expansion knots or sleeves 144 arranged within vertical surface 130. Screws 142 press holding rail 132 against vertical surface 130.

A slot formed between wall surface 130 and nose portion 134 is filled by a sealing or leak-proofing material 146 in the form of putty. A suitable putty is a resinous two component compound, which cures or sets in the slot and subsequently prevents leakage or entry of moisture between holding rail 132 and wall surface 130. Foil 148 which covers the wall surface is attached with its upper edge portion 150 to holding rail 132. Upper edge portion 150 overlies a portion of holding rail 132 and is connected to cover 138 of holding rail 132 by an uninterrupted longitudinally extending weld 152.

It will be understood that while holding rail 132 of FIG. 6 forms an end member of the sealing or insulating system comprising foil 148, holding rails may also be used intermediate the length or width of such foil. In such applications, profiles or cross-sections may be employed for the holding rail other than that shown in FIG. 6. When welding the foil to the thermoplastic cover of the holding rail by means of high frequency, the metallic core of the holding rail again serves as an auxiliary electrode for establishing the high frequency field. The welding electrode or electrodes are suitably made of rail type members arranged in parallel side by side relation and extending over a portion of the length of the holding rail.

In the case of a rail type holding member, it may be preferable to form the cover of a thermoplastic tube into which the core or rail is inserted. A cover surrounding the profile of the plate or rail is to be preferred since the cover may not be torn off the metallic core unless the cover layer is ruptured, i.e., the mechanical strength of the attachment is not dependent upon the adhesion of the cover layer to the surface of the holding member.

Rail type holding members are preferable in those applications where edges or edge portions of a foil are to be attached to a surface. The rail type holding member provides a seal between the edge of the foil and the surface when arranged parallel to the edge of the foil. Preferably, the profile of the rail is chosen such that its bending strength is particularly high in perpendicular direction with regard to the foil surface. Holding rails may be used not only on vertical but also on horizontal surfaces to obtain a seal or interconnection with a foil to be attached to the corresponding building surface or structure.

It will be understood that the method of attachment of insulating or sealing foils described may be employed with equal success on internal walls or roof surfaces. The method described is particularly suitable for lining of tunnels or galleries with foils. Furthermore, the method may be employed in cases where the foil is used as a wall or ceiling and is to be attached to a suitable supporting structure.

The term foil used in the foregoing will be understood as meaning sheets, webs or films or thermoplastic material of suitable thickness and strength. The term welding is to be understood in its broadest sense and is meant to embrace all interconnections which may be formed under the influence of heat. It will be noted that while the described method is of great simplicity and may be carried out in an economical manner, it prevents damage to the foil during the attachment thereof.

While there is shown and described present preferred embodiments of the invention, it is to be distinctly understood, that the invention is not limited thereto but may be otherwise variously embodied and practiced within the scope of the following claims. Accordingly, what is claimed is:

1. In combination with a thermoplastic foil an attachment device for securing the thermoplastic foil to a supporting structure, comprising:
   (a) holding plate means including a metal core having an opening therein, and a thermoplastic cover layer connected to said core;
   (b) connecting means disposed within said holding plate means and projecting therefrom to secure said holding plate means to said supporting structure; and
   (c) thermoplastic foil completely overlaying said holding plate means cover layer and welded thereto.

2. The combination of claim 1 wherein said core is embedded within said cover layer.

3. The combination of claim 1 wherein said holding plate means includes a substantially annular disc.

4. The combination of claim 1 wherein said holding plate means has a core of substantially frusto-conical cross section surrounded by a cover layer.

5. The combination of claim 1 wherein said holding plate means has a core of substantially wedge-shaped cross section adapted for securement to a vertical surface.

6. The combination of claim 1 wherein said connecting means is disposed within a substantially centrally located opening in said holding means, said opening extending from an upper to a lower surface of said holding plate means.

References Cited
UNITED STATES PATENTS

| | | | |
|---|---|---|---|
| 3,471,355 | 10/1969 | Truesdell et al. | 156—275 X |
| 2,734,466 | 2/1956 | Hammial et al. | 161—43 X |
| 2,511,168 | 6/1950 | Martin et al. | 161—48 X |
| 1,753,303 | 4/1930 | Reynolds | 156—71 X |
| 3,325,045 | 6/1967 | Habozit et al. | 52—309 X |
| 3,415,028 | 12/1968 | Nerem | 52—309 X |
| 3,408,786 | 11/1968 | Synker | 52—309 |

FOREIGN PATENTS

| | | | |
|---|---|---|---|
| 975,240 | 11/1964 | Great Britain | 85—1 |

PHILIP DIER, Primary Examiner

U.S. Cl. X.R.

52—127, 309; 85—1; 156—71; 161—48